(12) United States Patent
Schoenauer et al.

(10) Patent No.: US 10,941,822 B2
(45) Date of Patent: Mar. 9, 2021

(54) DISC BRAKE FOR A UTILITY VEHICLE AND BRAKE PAD FOR A DISC BRAKE

(71) Applicant: KNORR-BREMSE Systeme fuer Nutzfahrzeuge GmbH, Munich (DE)

(72) Inventors: Manfred Schoenauer, Munich (DE); Josef Schropp, Eichendorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 231 days.

(21) Appl. No.: 16/009,444

(22) Filed: Jun. 15, 2018

(65) Prior Publication Data

US 2018/0291973 A1 Oct. 11, 2018

Related U.S. Application Data

(63) Continuation of application No. PCT/EP2016/080834, filed on Dec. 13, 2016.

(30) Foreign Application Priority Data

Dec. 16, 2015 (DE) .................... 10 2015 121 942.5

(51) Int. Cl.
*F16D 65/40* (2006.01)
*F16D 65/097* (2006.01)
(Continued)

(52) U.S. Cl.
CPC ....... *F16D 65/0977* (2013.01); *F16D 55/226* (2013.01); *F16D 65/0068* (2013.01); *F16D 65/0974* (2013.01)

(58) Field of Classification Search
CPC ............. F16D 65/0973; F16D 65/0974; F16D 65/0977; F16D 65/0978
See application file for complete search history.

(56) References Cited

U.S. PATENT DOCUMENTS

| 4,428,463 A | 1/1984 | Burgdorf et al. |
| 5,875,873 A | 3/1999 | Kay et al. |

(Continued)

FOREIGN PATENT DOCUMENTS

| CN | 1802519 A | 7/2006 |
| CN | 101379315 A | 3/2009 |

(Continued)

OTHER PUBLICATIONS

Chinese-language Office Action issued in counterpart Chinese Application No. 201680079523.7 dated Apr. 26, 2019 with English translation (11 pages).

(Continued)

Primary Examiner — Nicholas J Lane
(74) Attorney, Agent, or Firm — Crowell & Moring LLP (57) ABSTRACT

A disc brake for a utility vehicle includes a brake caliper which engages over a vehicle-side brake disc, which is connected to a stationary brake carrier, and in which two brake pads are arranged which bear against the brake disc on both sides during a braking operation, having in each case one lining carrier plate and one friction lining which is fastened thereto, and of which at least one brake application-side brake pad is positioned in a pad shaft of the brake carrier, which pad shaft is delimited by two brake carrier horns. The lining carrier plate bears against stops of the brake carrier in a manner which is spring-loaded radially in the direction of a mounting opening of the brake caliper. The disc brake is configured in such a way that the brake pad is held on the brake caliper in a radially sprung manner.

6 Claims, 6 Drawing Sheets

(51) Int. Cl.
*F16D 55/226* (2006.01)
*F16D 65/00* (2006.01)

(56) References Cited

U.S. PATENT DOCUMENTS

| | | | |
|---|---|---|---|
| 5,941,348 | A | 8/1999 | Matsumoto et al. |
| 9,816,575 | B2 | 11/2017 | Falter et al. |
| 2001/0013448 | A1 | 8/2001 | Schorn et al. |
| 2004/0262099 | A1 | 12/2004 | Crippa |
| 2007/0137952 | A1 | 6/2007 | Cortinovis et al. |
| 2009/0008193 | A1 | 1/2009 | Sekiya et al. |
| 2010/0230220 | A1* | 9/2010 | Keller ............... F16D 65/092 188/73.31 |
| 2010/0276232 | A1* | 11/2010 | Keller ............... F16D 65/0977 188/73.31 |
| 2014/0345983 | A1* | 11/2014 | Baumgartner ....... F16D 55/02 188/73.31 |
| 2015/0184710 | A1 | 7/2015 | Peschel et al. |
| 2015/0192180 | A1* | 7/2015 | Kloos ............... F16D 65/092 188/73.31 |
| 2016/0108979 | A1 | 4/2016 | Falter et al. |
| 2016/0273600 | A1* | 9/2016 | Radhakrishnan ... F16D 65/0977 |
| 2017/0037916 | A1 | 2/2017 | Crippa et al. |
| 2017/0138426 | A1* | 5/2017 | Schoenauer ......... F16D 55/226 |

FOREIGN PATENT DOCUMENTS

| | | |
|---|---|---|
| CN | 104769307 A | 7/2015 |
| DE | 44 26 603 A1 | 2/1996 |
| DE | 698 16 175 T2 | 4/2004 |
| DE | 10 2012 002 734 A1 | 8/2013 |
| DE | 10 2013 008 160 A1 | 11/2014 |
| DE | 10 2013 008 161 A1 | 11/2014 |
| EP | 0 694 707 B1 | 10/2000 |
| FR | 2 221 028 A5 | 10/1974 |
| FR | 2 415 234 A1 | 8/1979 |
| GB | 1 416 122 | 12/1975 |
| GB | 2 159 221 A | 11/1985 |
| WO | WO 2015/155708 A1 | 10/2015 |
| WO | WO 2016/034378 A1 | 3/2016 |

OTHER PUBLICATIONS

German-language Office Action issued in counterpart German Application No. 10 2015 121 942.5 dated Sep. 30, 2016 (seven (7) pages).
International Preliminary Report on Patentability (PCT/IB/326 & PCT/IB/373) issued in PCT Application No. PCT/EP2016/080834 dated Jun. 28, 2018, including English translation of document C2 (German-language Written Opinion (PCT/ISA/237) previously filed on Jun. 15, 2018) (ten (10) pages).
International Search Report (PCT/ISA/210) issued in PCT Application No. PCT/EP2016/080834 dated Mar. 27, 2017 with English translation (seven pages).
German-language Written Opinion (PCT/ISA/237) issued in PCT Application No. PCT/EP2016/080834 dated Mar. 27, 2017 (six pages).

* cited by examiner

DISC BRAKE FOR A UTILITY VEHICLE AND BRAKE PAD FOR A DISC BRAKE

CROSS REFERENCE TO RELATED APPLICATIONS

This application is a continuation of PCT International Application No. PCT/EP2016/080834, filed Dec. 13, 2016, which claims priority under 35 U.S.C. § 119 from German Patent Application No. 10 2015 121 942.5, filed Dec. 16, 2015, the entire disclosures of which are herein expressly incorporated by reference.

BACKGROUND AND SUMMARY OF THE INVENTION

The invention relates to a disc brake for a utility vehicle and a brake pad for a disc brake.

During operation of utility (commercial) vehicles, the vehicles and, consequently, also their disc brakes are subjected to high loads, inter alia also resulting from weathering influences, particularly as the disc brakes are generally mounted in unprotected regions of the utility vehicle.

This results in problems in that the brake pads which are positioned in the pad shafts of the brake carrier may corrode as far as bonding with the corresponding components of the brake carrier since, located there, are the brake carrier horn-like members which delimit the respective pad shaft when viewed in the peripheral direction of the brake disc and a strut which connects them to each other and which forms the base of the pad shaft.

This bonding generally leads to increased wear of the brake pads and the brake disc but also to an increased temperature in a non-braked position since the stiff brake pads are practically permanently in abutment with the brake disc and produce a residual torque.

Although attempts have already been made to prevent this bonding by increasing the play between the brake pad, that is to say, primarily the lining carrier plate and the brake carrier, this greater play promotes the production of undesirable rattling noises during operation of the utility vehicle. Furthermore, the tendency of the brake pads to rotate out of the brake carrier when the brake is activated is increased, which in turn has a disadvantageous effect on an air gap of the brake, that is to say, the spacing between the brake pads and the brake disc, and on the wear of functional components, in particular the mechanism which is arranged in the brake caliper, since these functional components are more heavily loaded.

In order to provide assistance in this regard, that is to say, on the one hand, to minimize the movability of the brake pads and consequently prevent the production of rattling noises and, on the other hand, to nonetheless be able to construct a necessary freedom from play to be sufficiently large between the brake pads and the brake carrier and consequently to prevent the corrosion-related seizing of the brake pads or the stiffness thereof, it is, for example, proposed in U.S. Pat. No. 5,941,348 A to retain the brake pads on the brake carrier in a resiliently loaded manner. To this end, the brake carrier has stops against which the respective brake pad is in abutment with pretensioning in the direction of an assembly opening of the brake caliper. Consequently, in particular in the non-braked position, there is produced an optimized position of the brake pads.

The installation of the brake pads is first carried out by inserting the brake caliper into the brake carrier via the assembly opening and subsequent, with respect to the brake disc, axial insertion into the respective lining shaft, wherein a recess of the brake pad which corresponds to the respective stop of the brake carrier has to overlap. It is problematic in this instance that in the overlap region the spring, generally a leaf spring, has to be deformed for pretensioning the brake pad with respect to the brake carrier in order to be able to introduce the brake pad and to achieve the pretensioning of the spring.

The resulting particularly time-consuming assembly operations act counter to the demands which are always made for an optimized assembly both during the initial fitting of the brake disc with brake pads and during a subsequent replacement.

An object of the invention is to develop a brake disc of the generic type in such a manner that the assembly of the brake pads is simplified and the operating costs are consequently reduced.

This object is achieved by a disc brake having a brake caliper which engages over a vehicle-side brake disc and which is connected to a fixed brake carrier and in which two brake pads, which are in abutment during a braking operation at both sides with the brake disc and which each have a lining carrier plate and a friction lining which is secured thereto, are arranged. At least one brake-application-side brake pad is positioned in a pad shaft of the brake carrier delimited by two brake carrier horn-shaped members, wherein the lining carrier plate radially abuts in the direction of an assembly opening of the brake caliper in a resiliently loaded manner stops of the brake carrier. The brake pad is retained in a radially resilient manner on the brake caliper. This object is also achieved by a brake pad having a lining carrier plate and a friction lining which is secured thereto, wherein a lining retention spring which is constructed as a leaf spring is retained on the lining carrier plate. The lining retention spring has at least one groove which extends over the width thereof and which is recessed in the direction facing away from the lining carrier plate.

As a result of the construction according to the invention, the basic inventive notion is implemented of enabling the tensioning of the brake pad with the brake carrier only after completed assembly of the brake pad. In this instance, the brake pad can be assembled in the pad shaft in an almost force-free manner.

The invention can further be implemented with a disc brake in which the brake carrier has only one pad shaft for receiving a brake pad, that is to say, the brake-application-side brake pad, whilst the reaction-side brake pad is, for example, retained on the brake caliper.

Preferably, the disc brake which is equipped according to the invention has a brake carrier with two pad shafts for brake pads, of which one is associated with a side of the brake disc, respectively, wherein the brake disc which can be pneumatically or electromechanically activated may be constructed as a sliding caliper disc brake.

For radially resilient tensioning or pretensioning of the brake pad on the brake carrier, according to a development of the invention there is arranged at the side of the brake pad facing the assembly opening of the brake caliper on the lining carrier plate thereof a lining retention spring below which an inherently stable clamping element engages virtually as an abutment which is kept locked on the brake caliper.

In this instance, the clamping element, which practically forms a suspension for the brake pad, is constructed as a specially configured curved lining retention member, which after insertion of the brake pad is pushed below the lining retention spring and pulls the lining retention spring and consequently the brake pad against the stops of the brake carrier in the lining shaft, with play being formed with respect to the brake carrier.

For simpler assembly of the curved lining retention member, it has an inclined introduction member in order to thus be able to push the curved lining retention member more readily below the lining retention spring.

The lining retention spring is preferably constructed as a leaf spring and extends in the longitudinal direction at least in a part-region along the peripheral edge of the lining carrier plate facing the assembly opening, which plate is generally constructed in a convex manner.

In order to secure the lining retention spring, in the two opposing end regions of the peripheral edge of the lining carrier plate there may be formed barbs in which the lining retention spring engages in a positive-locking manner in the clamping direction of the spring, for which these barbs in each case extend through a through-opening of the lining retention spring.

Depending on requirements, the brake-application-side and/or the reaction-side brake pad in the context of the invention may be retained in a radially resilient manner on the brake caliper.

The curved lining retention member which forms the clamping element has, according to an advantageous development of the invention, two open longitudinal slots, which are arranged parallel with and spaced apart from each other, which extend in the axial direction of the brake disc and are arranged in the two opposing edge regions of the longitudinal sides of the curved lining retention member. The two slots are open in the insertion direction so that there are formed at the outer side two prongs which each pass below a groove-like recess of the lining retention spring, wherein these prongs have the inclined introduction members mentioned.

A, so to speak, central web which is delimited by the two longitudinal slots is positioned in this instance on the lining retention spring so that the lining retention spring is retained in each radial direction.

The curved lining retention member is also formed in a comparable manner when both brake pads are retained according to the invention.

Furthermore, the curved lining retention member bridges the assembly opening and is secured to the brake caliper, to this end, on the one hand, for example, inserted in a formed-on pocket and, on the other hand, inserted into a hook-like receiving member which are both provided in the edge region of the brake caliper delimiting the assembly opening.

It should further be mentioned in particular that the invention can be carried out in a particularly simple manner since both the lining retention springs and the curved lining retention member in their corresponding configuration can be produced in an extremely simple manner as shaped components.

The brake pad according to the invention which has a lining carrier plate and a friction lining which is secured thereto is constructed in such a manner that the lining retention spring is secured to a peripheral edge of the lining carrier plate, wherein it has at least one groove which extends over the width of the lining retention spring and which is recessed in the direction facing away from the lining carrier plate. In this instance, this groove may be constructed to be angular or round in cross-section.

When only one groove is arranged, the web of the curved lining retention member which is formed between the prongs engages below the groove, whilst the dual-sided prongs are positioned on the lining retention spring.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
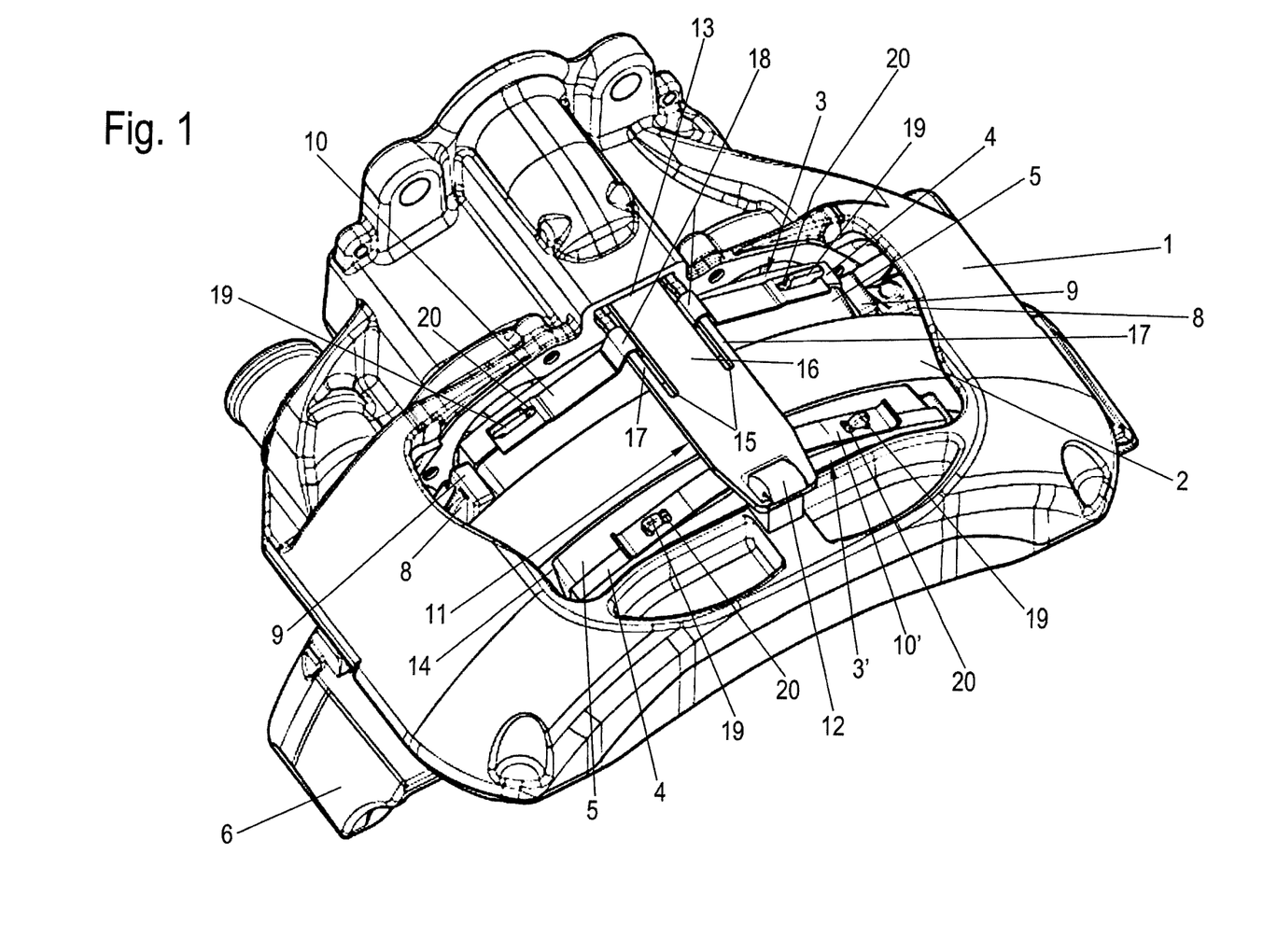
FIG. 1 is a perspective view of an embodiment of a disc brake according to the invention.
Figure 2:
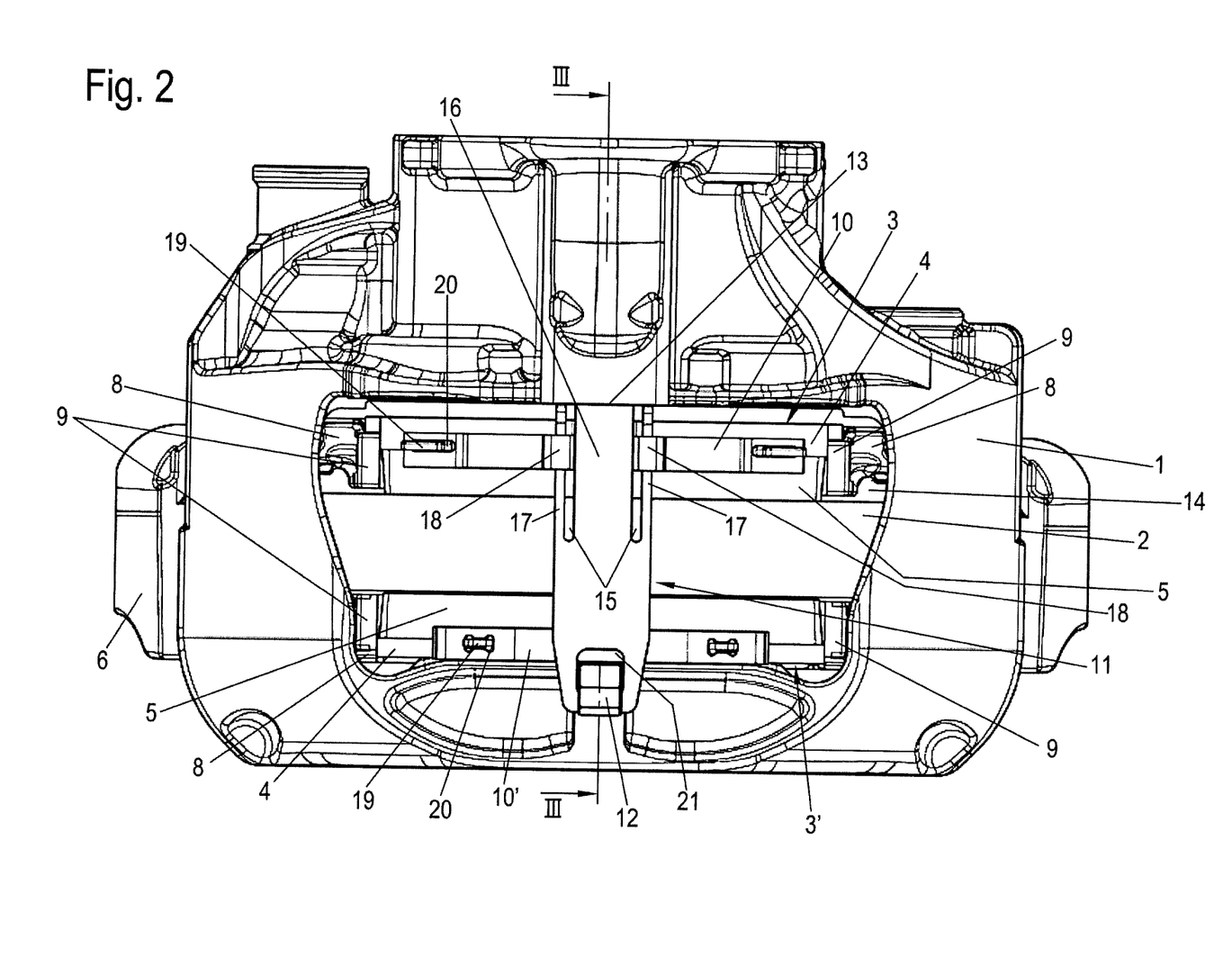
FIG. 2 is a plan view of the disc brake according to FIG. 1.

In FIGS. 1 and 2, a disc brake for a utility (commercial) vehicle is illustrated having a brake caliper 1 which engages over a brake disc 2 and which is supported in an axially displaceable manner on a fixed brake carrier 6, with respect to the brake disc 2. Such a disc brake is also known as a sliding caliper disc brake.

Figure 4:
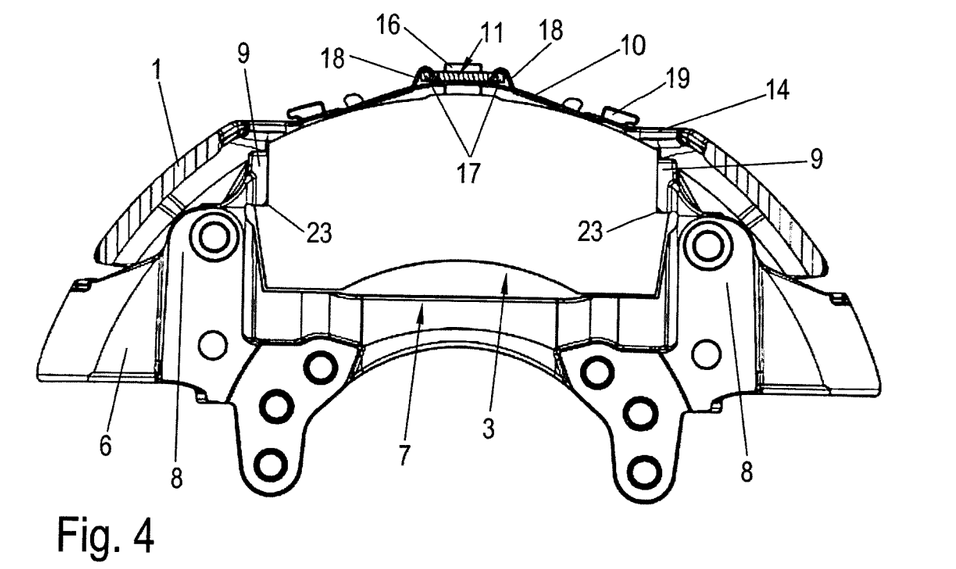
FIG. 4 is a sectioned front view of the disc brake according to FIG. 2.

The brake carrier 6 has two pad shafts 7, of which one is shown in FIG. 4. A brake pad 3, 3' is retained in these pad shafts 7 in each case, wherein in FIG. 4 a brake-application-side brake pad 3 can be seen.

Each brake pad 3, 3' has a lining carrier plate 4 and a friction lining 5 which is retained thereon, which are pressed during a braking operation at both sides onto the brake disc 2.

As can further be seen very clearly in particular in FIG. 4, the pad shaft 7 is delimited in the peripheral direction of the brake disc 2 by two brake carrier horn-shaped members 8, which have at the sides thereof facing an assembly opening 14 of the brake caliper 1, stops 9 which protrude into the pad shaft 7 and with which the lining carrier plate 4 of the brake pad 3 are in abutment in a resiliently loaded manner with a stepped portion 23 so that the brake pad 3 is secured in the direction of the assembly opening 14. As can also be seen in FIG. 4, the brake pad 3 is positioned with play at least with respect to the base of the lining shaft 7.

FIG. 2 and FIG. 1 show that, for example, the brake-application-side brake pad 3 according to the invention is retained in a radially resilient manner on the brake caliper 1.

To this end, the brake pad 3 has a lining retention spring 10 which is secured to the peripheral edge of the lining carrier plate 4 facing the assembly opening 14 and which is in engagement with a clamping element which is constructed as a curved lining retention member 11.

The lining retention spring 10 is provided in the engagement region of the curved lining retention member 11 with two grooves 18 which are arranged parallel with and with spacing from each other and which extend over the width of the lining retention spring 10. The two grooves are constructed so as to be curved outward, that is to say, in the direction facing away from the lining carrier plate, and in which two prongs 17 of the curved lining retention member 11 are guided, wherein these prongs 17 engage below the lining retention spring 10.

Figure 5:
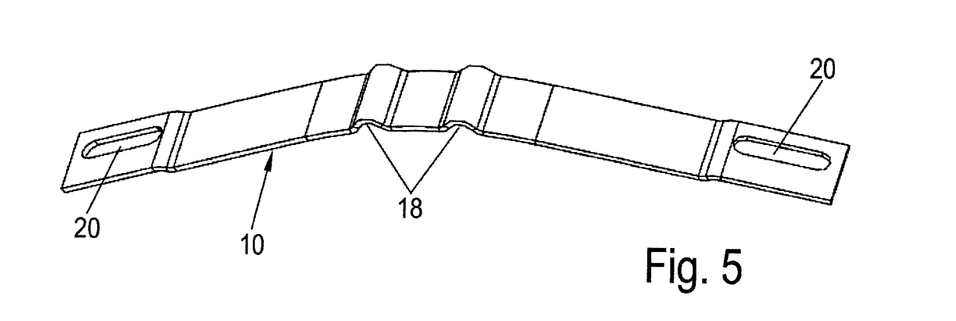
FIGS. 5 and 6 are perspective views of a detail of the disc brake, respectively.
Figure 6:
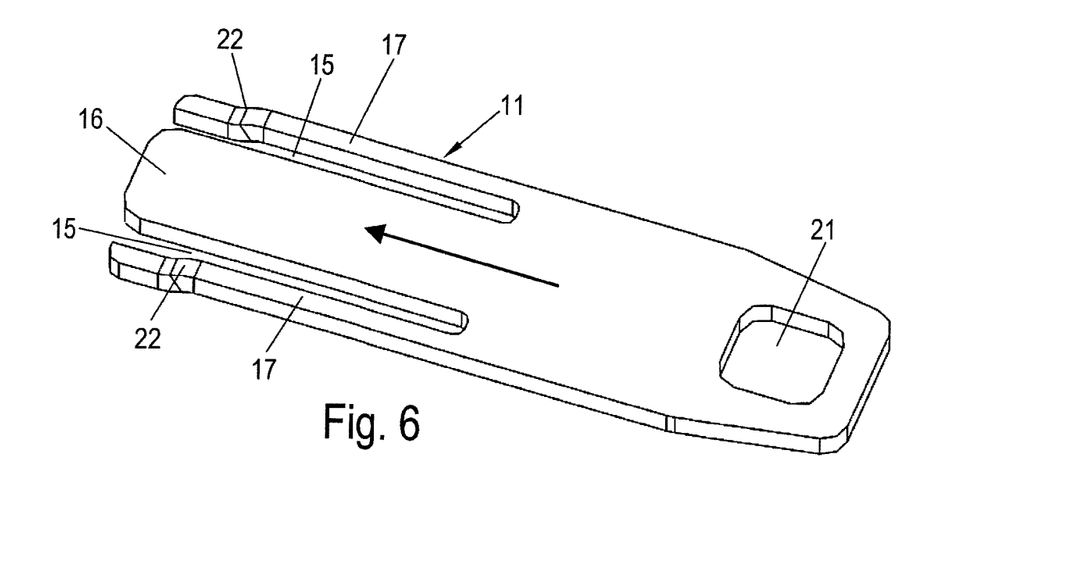

FIG. 5 shows the lining retention spring 10 as a detail, whilst FIG. 6 also illustrates the curved lining retention member 11 as a detail.

In FIG. 6, it can be seen that the prongs 17 are formed by means of two continuous longitudinal slots 15 which are arranged parallel with and with spacing from each other and which are open at one end, whilst the central region which is produced and which is delimited by the longitudinal slots 15 forms a web 16 which, in the assembled position, is positioned on the lining retention spring 10 between the two grooves 18.

FIG. 6 shows particularly clearly that the prongs 17 each have in the free end region thereof an inclined introduction member 22, which members enable the curved lining retention member 11 to be readily pushed onto the lining retention spring 10.

For assembly of the, in this instance, brake-application-side brake pad 3, it is first joined via the assembly opening 14 in the lateral region of the brake carrier 6 outside the pad shaft 7, subsequently pushed in the axial direction of the brake disc 2 into the pad shaft 7, where it is arranged with the graduations 23 below the stops 9, at the same time being supported on the base of the lining shaft 7.

Subsequently, the curved lining retention member 11 is pushed with the prongs 17 thereof below the lining retention spring 10 in the region of the grooves 18, wherein the web 16 comes to rest on the leaf spring 10 between the grooves 18 which are raised with respect thereto.

In this instance, the brake pad 3 is pulled virtually with resilient loading against the stops 9, with play being formed with respect to the base of the lining shaft 7.

In order to secure the lining retention spring 10, but also to secure the lining retention spring 10' of the reaction-side brake pad 3', there are arranged on the peripheral edge of the lining carrier plate 4 facing the assembly opening 14 or the curved lining retention member 11, barbs 19 which extend through through-openings 20 of the lining retention springs 10, 10' and which, with corresponding deformation of the lining retention springs 10, 10', engage behind the undercuts of the barbs 19.

The reaction-side brake pad 3' is pressed with pretensioning of the lining retention spring 10' in correspondence with the curved lining retention member 11 into the associated lining shaft 7 of the brake carrier 6.

Figure 7:
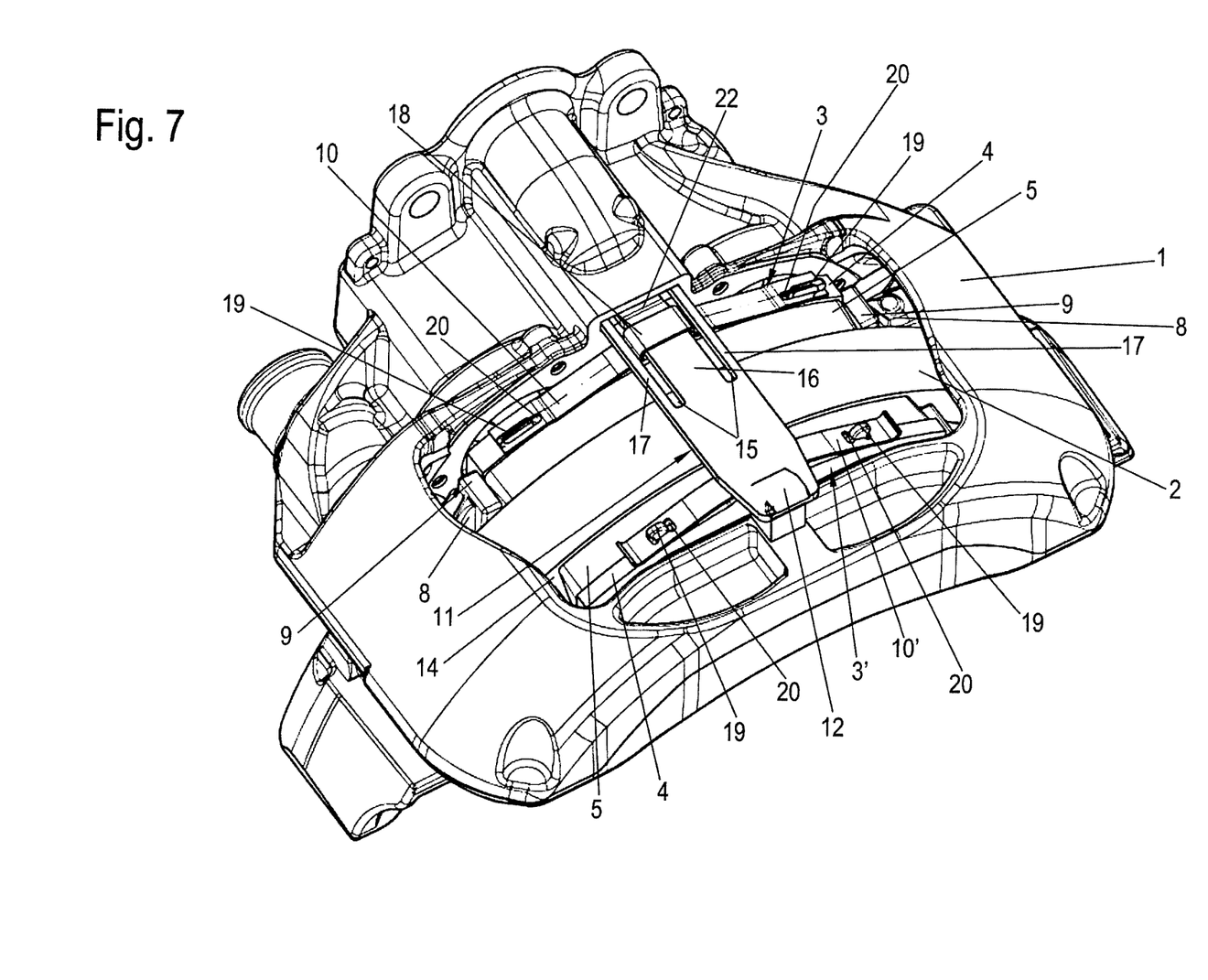
FIG. 7 is a schematic illustration of another embodiment of a disc brake according to the invention.

In terms of basic structure, the additional embodiment shown in FIG. 7 of a disc brake corresponds to the one shown in FIGS. 1 and 2.

In this instance, however, both the lining retention spring 10 of the brake-application-side brake pad 3 and the curved lining retention member 11 which is connected thereto are constructed differently.

Figure 8:
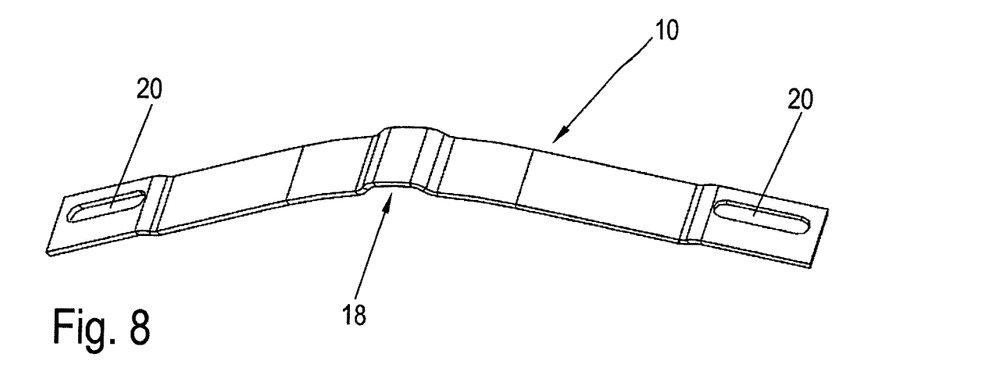
FIGS. 8 and 9 each show a detail of the disc brake according to FIG. 7, also illustrated in a schematic manner.
Figure 9:
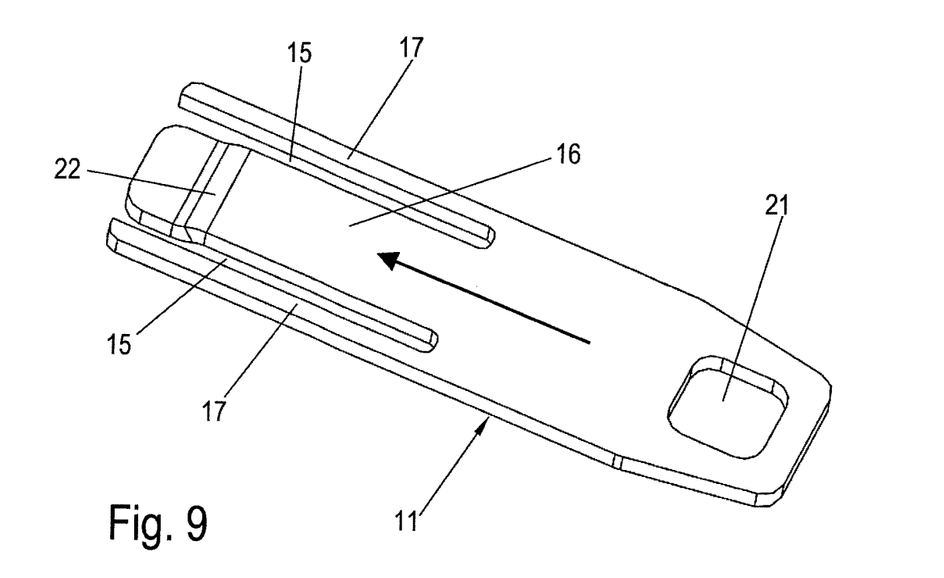

Both the lining retention spring 10 and the curved lining retention member 11 of the embodiment according to FIG. 7 are illustrated in FIGS. 8 and 9.

It can be seen therein that the lining retention spring 10 has only one groove 18 which is curved so as to be directed outward, that is to say, counter to the lining carrier plate 4, and which also extends over the width of the lining retention spring 10 and in which the web rests 16 so as to engage below the lining retention spring 10. The two prongs 17 are in contrast then positioned at both sides of the groove 18 on the lining retention spring 10. For easier assembly, the web 16 also has an inclined introduction portion 22, comparable to the one shown in FIG. 6.

In order to secure the curved lining retention member 11 to the brake caliper 1, the curved lining retention member 11 has a window-like cut-out 21 which engages behind a hook-like receiving member 12 which is formed on the brake caliper 1, whilst the opposing end associated with the prongs 17 or the web 16 is introduced into a pocket 13 of the brake caliper 1.

Figure 3:
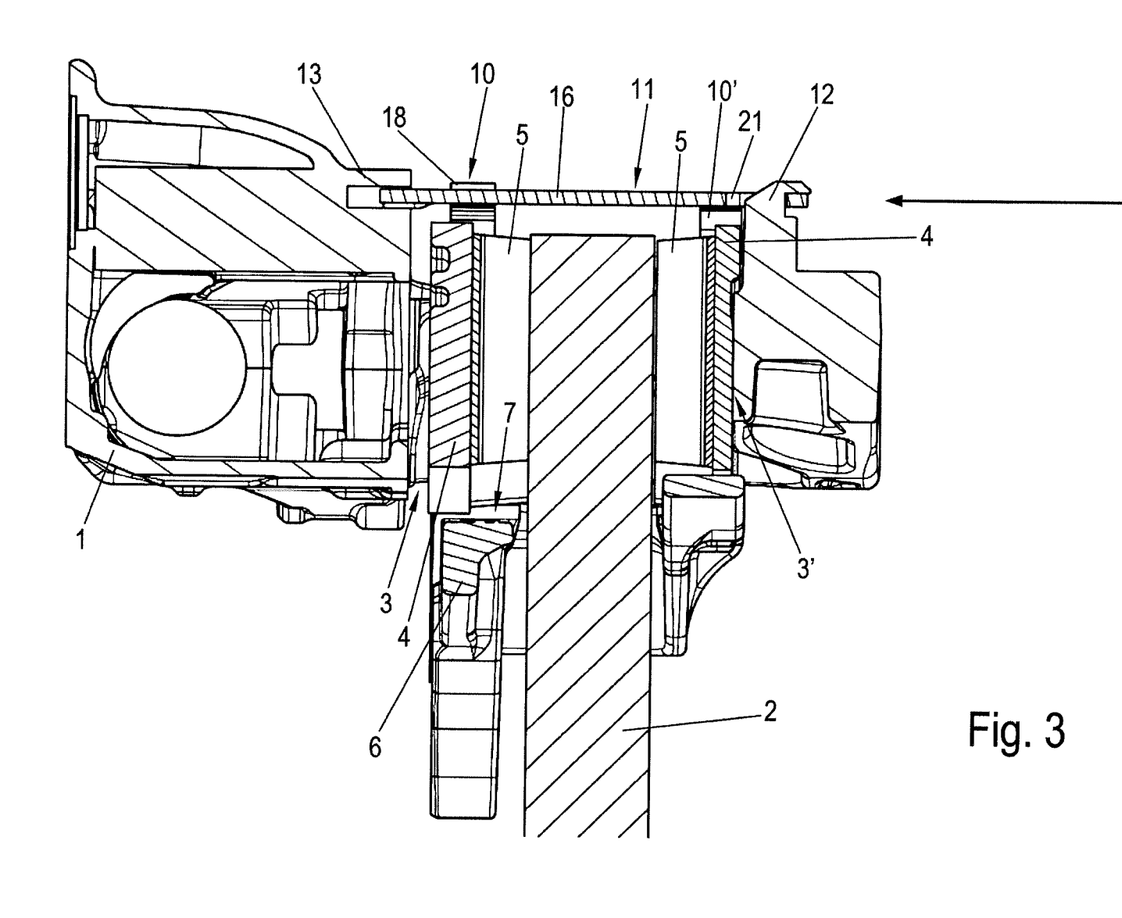
FIG. 3 is a section through the disc brake along the line in FIG. 2.

In order to assemble the curved lining retention member 11, it is guided with the cut-out 21 thereof over the hook-like receiving member 12 and subsequently pushed into the pocket 13 in the direction of the arrows which can be seen in FIGS. 3, 6 and 9 with the opposing end thereof, engaging at the same time under or over the lining retention spring 10, wherein in this position the edge of the cut-out 21 engages behind the undercut of the receiving member 12. For a desired locking of the curved lining retention member 11 in this position, corresponding known measures can be taken.

LIST OF REFERENCE NUMERALS

1 Brake caliper
2 Brake disc
3 Brake pad
3' Brake pad
4 Lining carrier plate
5 Friction lining
6 Brake carrier
7 Pad shaft
8 Brake carrier horn-like member
9 Stop
10 Lining retention spring
10' Lining retention spring
11 Curved lining retention member
12 Hook-like receiving member
13 Pocket
14 Assembly opening
15 Longitudinal slot
16 Web
17 Prongs
18 Groove
19 Barbs
20 Through-opening
21 Cut-out
22 Inclined introduction member
23 Graduation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a utility vehicle, comprising:
   a brake caliper which engages over a vehicle-side brake disc and which is connected to a fixed brake carrier and in which two brake pads, which are in abutment during a braking operation at both sides with the brake disc and which each have a lining carrier plate and a friction lining which is secured thereto, are arranged, wherein
   at least one brake-application-side brake pad is positioned in a pad shaft of the brake carrier delimited by two brake carrier horn-shaped members,
   the lining carrier plate abuts stops of the brake carrier in a radially-outward direction,
   the brake pad is retained in a radially resilient manner on the brake caliper, secured to the brake pad, at a peripheral edge facing the assembly opening, is a resilient element which is in engagement with an inherently stable clamping element which is secured to the brake caliper, the resilient element comprises a lining retention spring which is constructed as a leaf spring, and the clamping element comprises a curved lining retention member which bridges the assembly opening in an axial direction of the brake disc, and, the curved lining retention member has two open longitudinal slots which extend in the longitudinal direction and which are arranged parallel with and with spacing from each other, and by which there are formed a central web and prongs which delimit a part-region of the longitudinal edges of the curved lining retention member.

2. The disc brake as claimed in claim 1, wherein the lining retention spring has at least one groove which extends over the width of the lining retention spring and which is constructed to be recessed in the direction of the assembly opening.

3. The disc brake as claimed in claim 2, wherein each prong rests in a groove, whilst the web is positioned on the region of the leaf spring which is formed between the two grooves which are arranged parallel with and with spacing from each other.

4. The disc brake as claimed in claim 2, wherein the web rests in the groove and the prongs are positioned on the regions of the lining retention spring adjacent to the groove.

5. The disc brake as claimed in claim 1, wherein the prongs or the web are each provided in the free end regions thereof with an inclined introduction member.

6. The disc brake as claimed in claim 1, wherein the curved lining retention member is inserted, on the one hand, in a pocket of the brake caliper and is, on the other hand, retained on a hook-shaped receiving member of the brake caliper, the hook-shaped receiving member has at the side thereof facing away from the brake pads a relief in which a peripheral region of the curved lining retention member delimiting a cut-out rests.

* * * * *